United States Patent
Akman et al.

(10) Patent No.: US 10,042,899 B2
(45) Date of Patent: Aug. 7, 2018

(54) AUTOMATIC REGISTRATION

(71) Applicant: Autodesk, Inc., San Rafael, CA (US)

(72) Inventors: Oytun Akman, Kensington, CA (US);
Ronald Poelman, San Rafael, CA (US);
Seth Koterba, Valrico, FL (US)

(73) Assignee: Autodesk, Inc., San Rafael, CA (US)

( * ) Notice: Subject to any disclaimer, the term of this patent is extended or adjusted under 35 U.S.C. 154(b) by 0 days.

(21) Appl. No.: 15/625,499

(22) Filed: Jun. 16, 2017

(65) Prior Publication Data

US 2017/0286430 A1 Oct. 5, 2017

Related U.S. Application Data

(63) Continuation of application No. 14/558,243, filed on Dec. 2, 2014, now Pat. No. 9,740,711.

(60) Provisional application No. 61/910,698, filed on Dec. 2, 2013.

(51) Int. Cl.
*G06F 17/30* (2006.01)
*G06K 9/46* (2006.01)
*G06T 17/20* (2006.01)

(52) U.S. Cl.
CPC .... *G06F 17/3053* (2013.01); *G06F 17/30247* (2013.01); *G06F 17/30598* (2013.01); *G06K 9/46* (2013.01); *G06T 17/20* (2013.01)

(58) Field of Classification Search
CPC ........ G06F 17/30247; G06F 17/30256; G06K 9/46; G06T 17/20; G06T 19/20; G06T 2200/08
USPC ........................................................ 707/737
See application file for complete search history.

(56) References Cited

U.S. PATENT DOCUMENTS

| | | | | |
|---|---|---|---|---|
| 2005/0243323 A1* | 11/2005 | Hsu | ...................... | G06K 9/3241 356/450 |
| 2008/0310757 A1* | 12/2008 | Wolberg | ............ | G06K 9/00208 382/285 |
| 2009/0041314 A1 | 2/2009 | Vercauteren et al. | | |
| 2014/0225988 A1* | 8/2014 | Poropat | ................... | G01S 17/89 348/46 |
| 2015/0003723 A1* | 1/2015 | Huang | ................. | G06K 9/6212 382/154 |

OTHER PUBLICATIONS

Bae, K., et al., "Automated Registration of Unorganised Point Clouds From Terrestrial Laser Scanners", Department of Spatial Sciences, Curtin University of Technology, Australia, Thesis, 2006, PID 16596. http://espace.library.curtin,edu.au:80/R?func=dbin-jump-full&local_base=gen01-era02&object_id=16596.

(Continued)

*Primary Examiner* — Thu-Nguyet Le
(74) *Attorney, Agent, or Firm* — Gates & Cooper LLP

(57) ABSTRACT

A method, system, apparatus, article of manufacture, and computer-readable storage medium provide the ability to merge multiple point cloud scans. A first raw scan file and a second raw scan file (each including multiple points) are imported. The scan files are segmented by extracting segments based on geometry in the scene. The segments are filtered to reduce a number of segments and identify features. A set of candidate matching feature pairs are acquired by coarsely registering features from one scan to features from another scan. The candidate pairs are refined by improving alignment based on corresponding points in the features. The candidate pairs are scored and then merged based on the scores.

18 Claims, 3 Drawing Sheets

(56) References Cited

OTHER PUBLICATIONS

Bae, K., et al., "A method for automated registration of unorganised point clouds", ISPRS Journal of Photogrammetry & Remote Sensing, vol. 63, Issue 1, pp. 36-54, Jan. 2008.
Barnea, S., et al., "Keypoint based autonomous registration of terrestrial laser point-clouds", ISPRS Journal of Photogrammetry & Remote Sensing 63, pp. 19-35 (2008).
He, W., et al., "Automatic Registration of Range Images Based on Correspondence of Complete Plane Patches", Proceedings of the Fifth International Conference on 3-D Digital Imaging and Modeling (3DIM'05), IEEE 2005.
Magnusson, M., et al., "Scan Registration for Autonomous Mining Vehicles Using 3D-NDT", Journal of Field Robotics 24(10), pp. 803-827, 2007.
Makadia, A., et al., "Fully Automatic Registration of 3D Point Clouds", Proceedings of the 2006 IEEE Computer Society Conference on Computer Vision and Pattern Recognition, New York: IEEE, 2006.
Seo, J. K., et al., "Range Data Registration Using Photometric Features", IEEE, 2005.
Von Hansen, W., "Robust Automatic Marker-Free Registration of Terrestrial Scan Data", In: W. Forstner and R. Steffen (eds), Photogrammetric Computer Vision, ISPRS, vol. XXXVI, Part 3, Germany, Sep. 20-22, 2006.
Wu, C., et al., "3D Model Matching with Viewpoint-Invariant Patches (VIP)", IEEE Conference on Computer Vision and Pattern Recognition 2008, Jun. 23-28, 2008, pp. 1-8.

\* cited by examiner

AUTOMATIC REGISTRATION

CROSS-REFERENCE TO RELATED APPLICATIONS

This application is a continuation under 35 U.S.C. § 120 of application Ser. No. [14/558,243], filed on Dec. 2, 2014, with inventor(s) Oytun Akman, Ronald Poelman, and Seth Koterba, entitled "AUTOMATIC REGISTRATION," which application is incorporated by reference herein, and which application claims the benefit under 35 U.S.C. Section 119(e) of the following co-pending and commonly-assigned U.S. provisional patent application(s), which is/are incorporated by reference herein: Provisional Application Ser. No. 61/910,698, filed on Dec. 2, 2013, by Oytun Akman, Ronald Poelman, and Seth Koterba, entitled "Automatic Registration,".

This application is related to the following co-pending and commonly-assigned patent application, which application is incorporated by reference herein:

U.S. Pat. No. 9,508,186/patent application Ser. No. 14/536,266, entitled "PRE-SEGMENT POINT CLOUD DATA TO RUN REAL-TIME SHAPE EXTRACTION FASTER", by Ronald Poelman and Oytun Akman, filed on Nov. 7, 2014, and issued on Nov. 29, 2016, which application claims the benefit under 35 U.S.C. Section 119(e) of Provisional Application Ser. No. 61/901,069, filed on Nov. 7, 2013, by Ronald Poelman and Oytun Akman, entitled "Pre-Segment Point Cloud Data to Run Real-Time Shape Extraction Faster,"; and U.S. patent application Ser. No. 14/536,232, entitled "OCCLUSION RENDER MECHANISM FOR POINT CLOUDS", by Paulus Jacobus Holverda and Ronald Poelman, filed on Nov. 7, 2014, which application claims the benefit under 35 U.S.C. Section 119(e) of Provisional Application Ser. No. 61/901,067, filed on Nov. 7, 2013, by Paul Holverda and Ronald Poelman, entitled "Occlusion Render Mechanism for Point Clouds,".

BACKGROUND OF THE INVENTION

1. Field of the Invention

The present invention relates generally to point cloud data, and in particular, to a method, apparatus, and article of manufacture for automatically registering/merging different scans of point cloud data.

2. Description of the Related Art

Point cloud data is often acquired using laser scans of an area. It is often not possible to utilize a single scan to capture the desired area/structure. Thus, multiple laser scan range images (i.e., panoramic representations with a depth component) may be utilized to capture a desired area/structure. However, each scan has a unique vantage point and the different scans do not know where they are with respect to each other. It is desirable to determine how such scans overlap/align with each other in coordinate space. In other words, one scan may have some measurements (e.g., the distance between the wall and floor, etc.). However, the one scan may not cover the whole distance of an object/area (e.g., a building). If the multiple scans are aligned, the measurement of the full length of the area (e.g., building) may be determined. Embodiments of the invention attempt to automatically register the different scans together to create a single image that includes multiple accurately aligned scans.

SUMMARY OF THE INVENTION

Embodiments of the invention align multiple scans into a single coordinate space in a geometric manner. Scans are imported. The imported scans are segmented. The segments that have certain geometric attributes (e.g., planar) are used as input for a registration process (i.e., the segments that are used as input are filtered such that a subset of the segments are processed through the system). The system then searches the segments for matches to determine the proper alignment.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1:
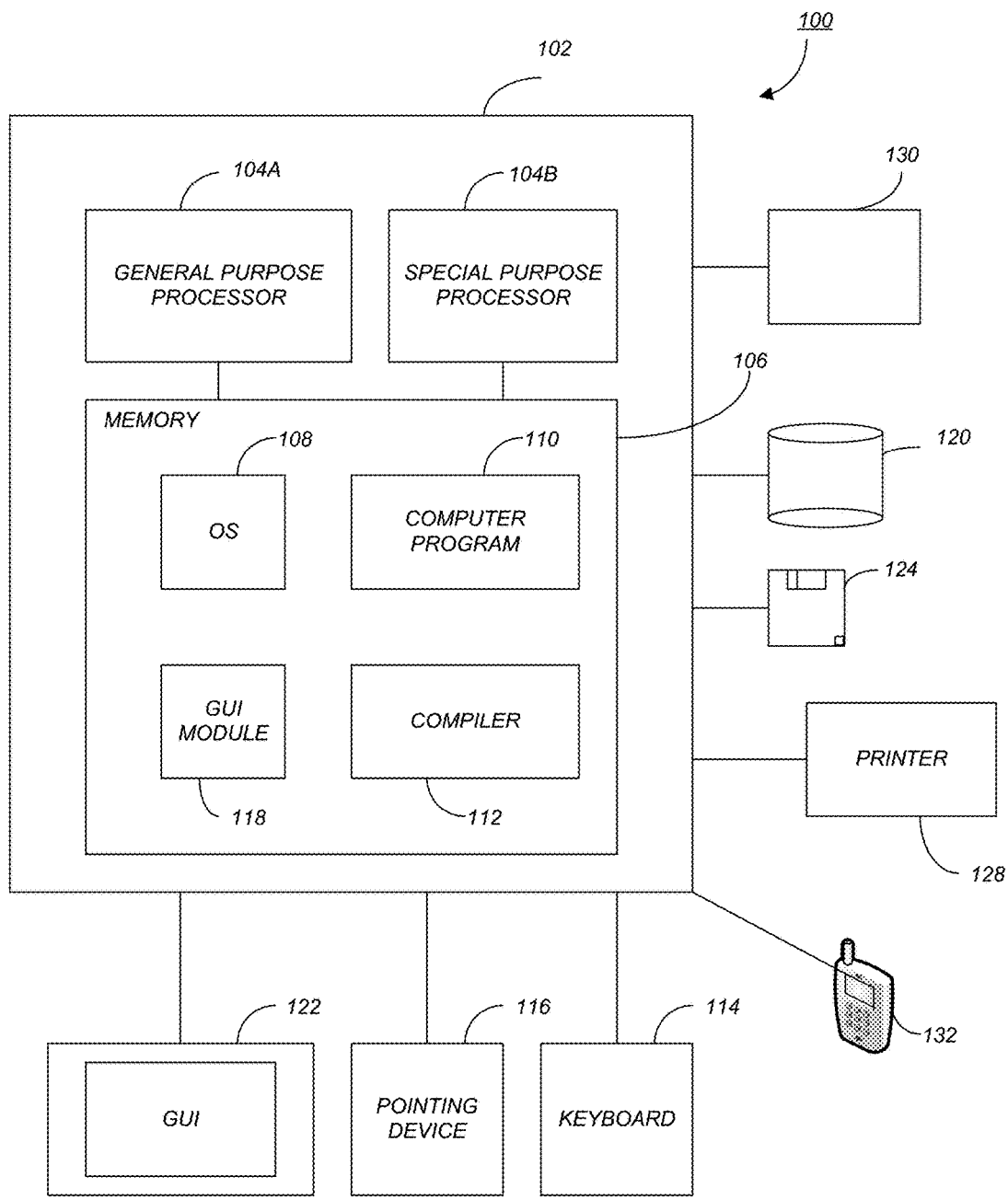
FIG. 1 is an exemplary hardware and software environment used to implement one or more embodiments of the invention.

FIG. 1 is an exemplary hardware and software environment 100 used to implement one or more embodiments of the invention. The hardware and software environment includes a computer 102 and may include peripherals. Computer 102 may be a user/client computer, server computer, or may be a database computer. The computer 102 comprises a general purpose hardware processor 104A and/or a special purpose hardware processor 104B (hereinafter alternatively collectively referred to as processor 104) and a memory 106, such as random access memory (RAM). The computer 102 may be coupled to, and/or integrated with, other devices, including input/output (I/O) devices such as a keyboard 114, a cursor control device 116 (e.g., a mouse, a pointing device, pen and tablet, touch screen, multi-touch device, etc.) and a printer 128. In one or more embodiments, computer 102 may be coupled to, or may comprise, a portable or media viewing/listening device 132 (e.g., an MP3 player, iPod™, Nook™, portable digital video player, cellular device, personal digital assistant, etc.). In yet another embodiment, the computer 102 may comprise a multi-touch device, mobile phone, gaming system, internet enabled television, television set top box, or other internet enabled device executing on various platforms and operating systems.

In one or more embodiments, computer 102 is communicatively coupled to, or may comprise, a laser scanner 134. Such a laser scanner 134 may consist of a field measurement device capable of producing a three-dimensional (3D) representation of present conditions through the collection of individually measured points. The set of all points collected and registered with another after the scanning process is referred to as a point cloud. Such a point cloud may be stored in data storage devices 120/124, within the scanner 134, in memory 106, and/or in any other device capable of storing such information. The laser scanner 134 may utilize a variety of scanning methods including aerial, static, and mobile. Such laser scanning may scan millions of point in seconds without climbing on equipment and/or conducting contact measurements.

In one embodiment, the computer 102 operates by the general purpose processor 104A performing instructions defined by the computer program 110 under control of an operating system 108. The computer program 110 and/or the operating system 108 may be stored in the memory 106 and may interface with the user and/or other devices to accept input and commands and, based on such input and commands and the instructions defined by the computer program 110 and operating system 108, to provide output and results.

Output/results may be presented on the display 122 or provided to another device for presentation or further processing or action. In one embodiment, the display 122 comprises a liquid crystal display (LCD) having a plurality of separately addressable liquid crystals. Alternatively, the display 122 may comprise a light emitting diode (LED) display having clusters of red, green and blue diodes driven together to form full-color pixels. Each liquid crystal or pixel of the display 122 changes to an opaque or translucent state to form a part of the image on the display in response to the data or information generated by the processor 104 from the application of the instructions of the computer program 110 and/or operating system 108 to the input and commands. The image may be provided through a graphical user interface (GUI) module 118. Although the GUI module 118 is depicted as a separate module, the instructions performing the GUI functions can be resident or distributed in the operating system 108, the computer program 110, or implemented with special purpose memory and processors.

In one or more embodiments, the display 122 is integrated with/into the computer 102 and comprises a multi-touch device having a touch sensing surface (e.g., track pod or touch screen) with the ability to recognize the presence of two or more points of contact with the surface. Examples of multi-touch devices include mobile devices (e.g., iPhone™, Nexus S™, Droid™ devices, etc.), tablet computers (e.g., iPad™, HP Touchpad™), portable/handheld game/music/video player/console devices (e.g., iPod Touch™, MP3 players, Nintendo 3DS™, PlayStation Portable™, etc.), touch tables, and walls (e.g., where an image is projected through acrylic and/or glass, and the image is then backlit with LEDs).

Some or all of the operations performed by the computer 102 according to the computer program 110 instructions may be implemented in a special purpose processor 104B. In this embodiment, some or all of the computer program 110 instructions may be implemented via firmware instructions stored in a read only memory (ROM), a programmable read only memory (PROM) or flash memory within the special purpose processor 104B or in memory 106. The special purpose processor 104B may also be hardwired through circuit design to perform some or all of the operations to implement the present invention. Further, the special purpose processor 104B may be a hybrid processor, which includes dedicated circuitry for performing a subset of functions, and other circuits for performing more general functions such as responding to computer program 110 instructions. In one embodiment, the special purpose processor 104B is an application specific integrated circuit (ASIC).

The computer 102 may also implement a compiler 112 that allows an application or computer program 110 written in a programming language such as COBOL, Pascal, C++, FORTRAN, or other language to be translated into processor 104 readable code. Alternatively, the compiler 112 may be an interpreter that executes instructions/source code directly, translates source code into an intermediate representation that is executed, or that executes stored precompiled code. Such source code may be written in a variety of programming languages such as Java™, Perl™, Basic™, etc. After completion, the application or computer program 110 accesses and manipulates data accepted from I/O devices and stored in the memory 106 of the computer 102 using the relationships and logic that were generated using the compiler 112.

The computer 102 also optionally comprises an external communication device such as a modem, satellite link, Ethernet card, or other device for accepting input from, and providing output to, other computers 102.

In one embodiment, instructions implementing the operating system 108, the computer program 110, and the compiler 112 are tangibly embodied in a non-transitory computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of computer program 110 instructions which, when accessed, read and executed by the computer 102, cause the computer 102 to perform the steps necessary to implement and/or use the present invention or to load the program of instructions into a memory 106, thus creating a special purpose data structure causing the computer 102 to operate as a specially programmed computer executing the method steps described herein. Computer program 110 and/or operating instructions may also be tangibly embodied in memory 106, data storage device 120/124 and/or data communications devices 130, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 102.

Figure 2:
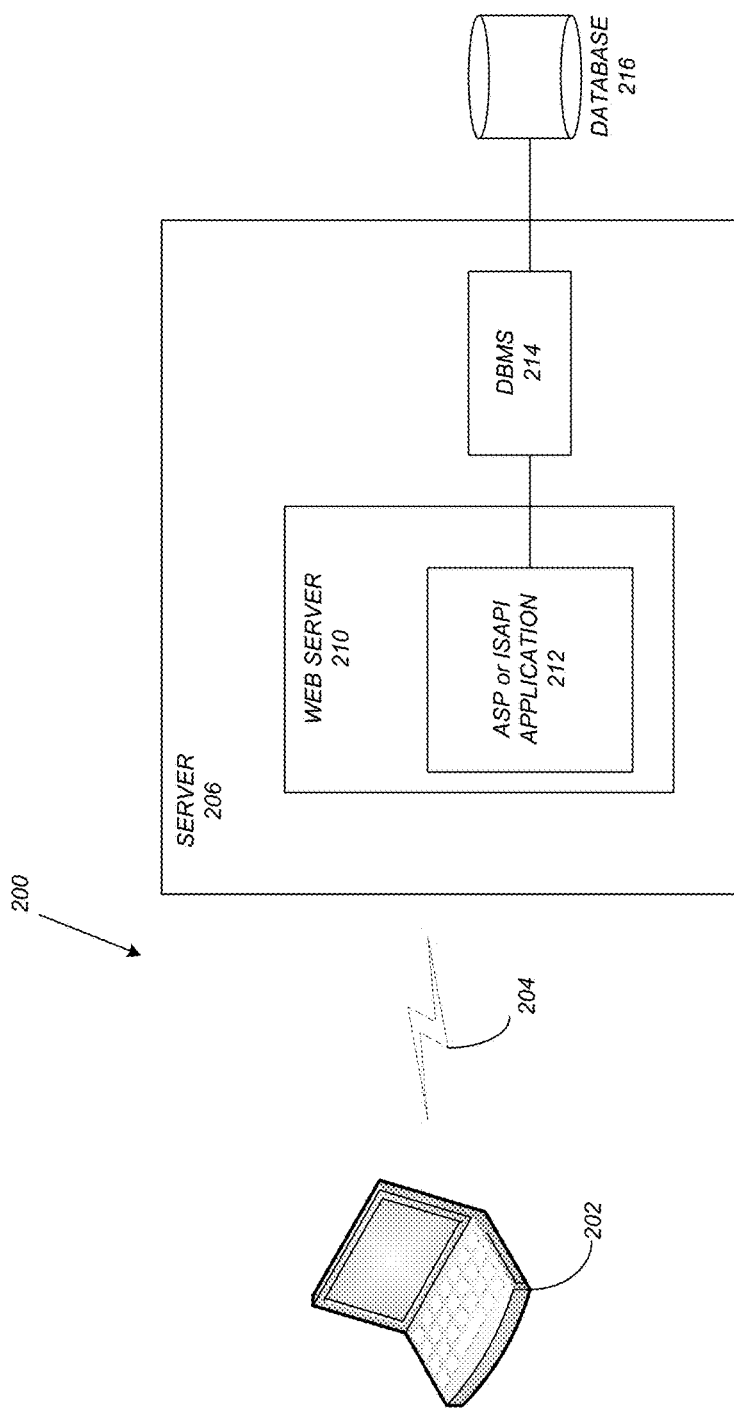
FIG. 2 schematically illustrates a typical distributed computer system using a network to connect client computers to server computers in accordance with one or more embodiments of the invention.

FIG. 2 schematically illustrates a typical distributed computer system 200 using a network 204 to connect client computers 202 to server computers 206. A typical combination of resources may include a network 204 comprising the Internet, LANs (local area networks), WANs (wide area networks), SNA (systems network architecture) networks, or the like, clients 202 that are personal computers or workstations (as set forth in FIG. 1), and servers 206 that are personal computers, workstations, minicomputers, or mainframes (as set forth in FIG. 1). However, it may be noted that different networks such as a cellular network (e.g., GSM [global system for mobile communications] or otherwise), a satellite based network, or any other type of network may be used to connect clients 202 and servers 206 in accordance with embodiments of the invention.

A network 204 such as the Internet connects clients 202 to server computers 206. Network 204 may utilize ethernet, coaxial cable, wireless communications, radio frequency (RF), etc. to connect and provide the communication between clients 202 and servers 206. Clients 202 may execute a client application or web browser and communicate with server computers 206 executing web servers 210. Such a web browser is typically a program such as MICROSOFT INTERNET EXPLORER™, MOZILLA FIREFOX™, OPERA™, APPLE SAFARI™, GOOGLE CHROME™, etc. Further, the software executing on clients 202 may be downloaded from server computer 206 to client computers 202 and installed as a plug-in or ACTIVEX™ control of a web browser. Accordingly, clients 202 may utilize ACTIVEX™ components/component object model (COM) or distributed COM (DCOM) components to provide a user interface on a display of client 202. The web server 210 is typically a program such as MICROSOFT'S INTERNET INFORMATION SERVER™.

Web server 210 may host an Active Server Page (ASP) or Internet Server Application Programming Interface (ISAPI) application 212, which may be executing scripts. The scripts invoke objects that execute business logic (referred to as business objects). The business objects then manipulate data in database 216 through a database management system (DBMS) 214. Alternatively, database 216 may be part of, or connected directly to, client 202 instead of communicating/obtaining the information from database 216 across network 204. When a developer encapsulates the business functionality into objects, the system may be referred to as a component object model (COM) system. Accordingly, the scripts executing on web server 210 (and/or application 212) invoke COM objects that implement the business logic. Further, server 206 may utilize MICROSOFT'S™ Transaction Server (MTS) to access required data stored in database 216 via an interface such as ADO (Active Data Objects), OLE DB (Object Linking and Embedding DataBase), or ODBC (Open DataBase Connectivity).

Generally, these components 200-216 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 202 and 206 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 202 and 206.

Embodiments of the invention are implemented as a software application on a client 202 or server computer 206. Further, as described above, the client 202 or server computer 206 may comprise a thin client device or a portable device that has a multi-touch-based display.

System Architecture

Figure 3:
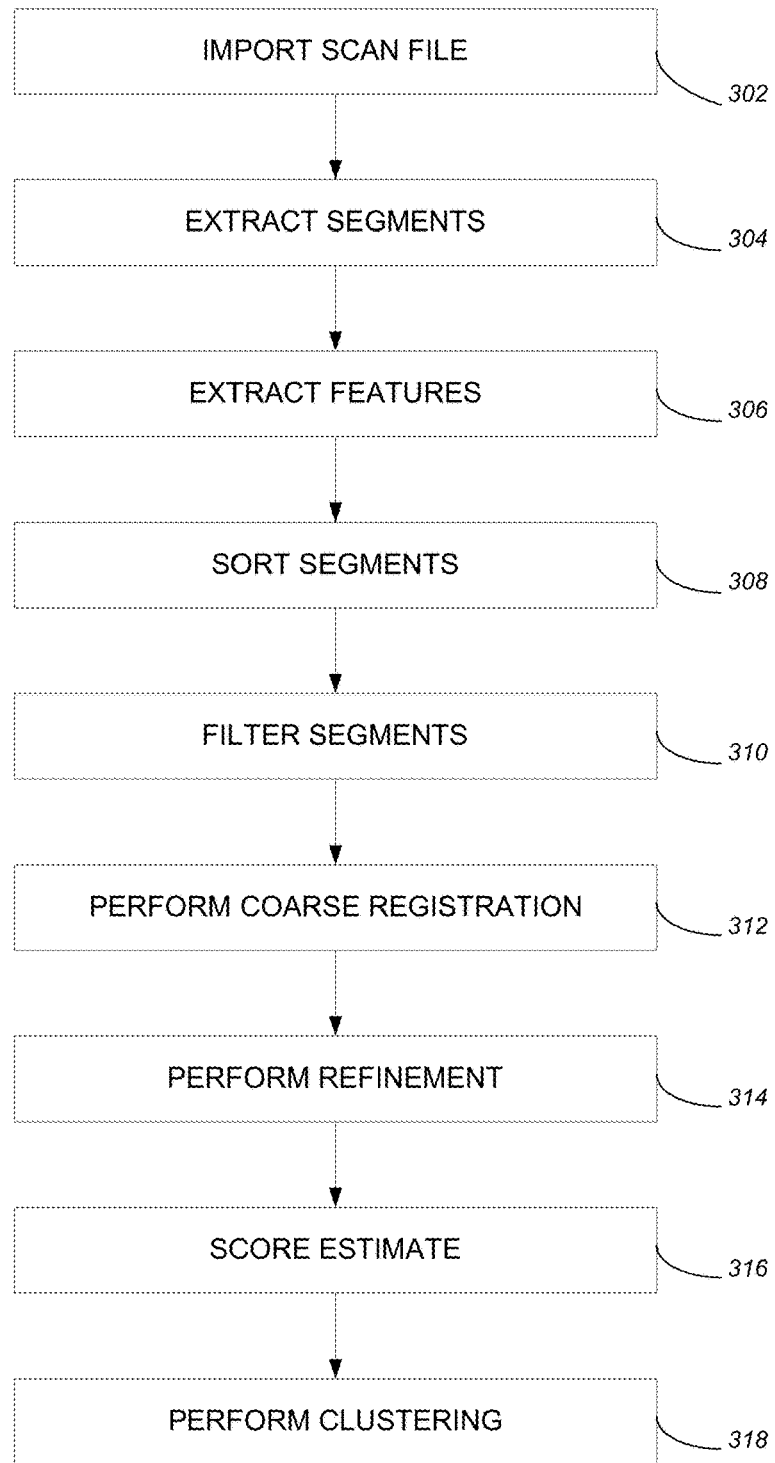
FIG. 3 illustrates the logical flow for automatically registering scans in accordance with one or more embodiments of the invention.

In this section, the design specifications and implementation details of an Auto-Reg (Automatic Registration) system are explained. This system enables users to register their scans automatically and group them into spatially coherent components. The goal is to design a generic, robust and accurate system that can operate on different data types captured from various scenes. FIG. 3 illustrates the logical flow for automatically registering scans in accordance with one or more embodiments of the invention.

Import

Initially, at step 302, raw scan files are imported to create compressed spherical images-rcc (reality capture compact) files (a proprietary file format available from the assignee of the present application). The rcc representation is highly (memory) efficient and separates the automatic registration from the input file type. Therefore, the processing is performed independently from the raw scan file format.

Preprocessing

Segmentation

Extracting segments from a point cloud needs to be performed well. If good segment extraction is not performed, subsequent steps (e.g., segment matching) may fail or produce poor results. Thus, at step 304 of FIG. 3, segments are extracted from the imported scan files. Details regarding steps that may be performed during an extraction are described in co-pending patent application Ser. No. 14/536,232 that is incorporated by reference herein.

Embodiments of the invention focus on building information modeling problems/systems. Such a focus relies on the environment to determine features that can then be used during the registration process. More specifically, larger segments (e.g., geometric primitives such as planar segments, cylinders, cones, etc.) may be utilized and provide beneficial results compared to that of smaller segments and/or segments that do not have/contain geometric primitives.

In view of the above, embodiments of the invention utilize the geometry information available in the scene by extracting homogeneous planar regions/segments (and/or segments containing geometric primitives). Extracted segments represent the scene geometry in a compact way that can be exploited to align a scan group.

In order to extract segments, the surface normal may be calculated for each point in the imported scan file. A combination of box-filtering and unconstrained least-squares estimation may be used for fast operation. Then, the extracted normals and spatial distance between points are utilized to group points into similar regions. A region growing method with smoothness constraints may be used to cluster the points with a step to cluster patches with similar orientation and boundaries. The measure of similarity between two points is defined using the angle between their normals and the plane-to-point distance between these points.

Feature Extraction

After the scan files are segmented (i.e., segments are extracted), at step 306, each segment is analyzed to create/extract features from the segments.

First an orthographic binary image is created by projecting segment members (3D points) onto an orthographic image plane. The pixel size for binary images varies depending on the segment size to normalize the effect of the spatial size of segments. Moreover, keeping only a single point for each pixel eliminates the effect of point density in the later refinement stages. This image is a two-dimensional (2D) representation of a 3D planar segment and by fitting a bounding box around the occupied pixels in this image, approximate 2D dimensions of the segment may be obtained.

At step 308, the segments are sorted according to their bounding box size since relatively bigger segments are more important for representing the geometry of the scene.

At step 310, the sorted segments are filtered based on a variety of attributes. The floor and ceiling are detected by using the segment size, segment normal and the z-coordinate of segments. Then the segments that belong to the ceiling and floor are removed from the list. This step ensures that horizontal planes are not used as they are not providing necessary information for the later coarse registration phase.

In view of the above, embodiments of the invention first try and find the floor and ceiling (because they are dominant). It is assumed that the scanner may be a little off (i.e., it is undesirable to rely on the scanner being set up on a tripod or that the surface the scanner is standing on is vertical). By identifying/detecting the floor and ceiling, one may filter and/or reduce the amount of segments/features that need to be examined in later steps.

Accordingly, the segments are separated into two groups: vertical and horizontal segments. Horizontal segments are defined as the segments with surface normals close to the floor's or the ceiling's normal. The rest of the segments are classified as vertical segments. Further, embodiments of the invention may only need/utilize vectors (e.g., the direction of the segment and its center location). Thus, although primitive geometry may be extracted, the geometry may be described as a pure vector that lives somewhere in space with respect to the origin of the scan.

To further reduce the number of segments that are used during later phases, only the large segments (or larger geometry pieces) may be retained. For example, the largest N (50) vertical segments (or other predefined number of segments) are selected as features for registration.

Look-up tables are created for fast processing in the later stages. One or more of the following may be stored in the look-up tables:
  angle between each feature's normal and the z-axis;
  angle between the normals of feature pairs in different look-up tables; and
  a map that stores the indices of features that have a similar angle with the z-axis.

In this regard, since vectors themselves can be matched, the vectors may be used to calculate angles between selected planar elements in the scene. Embodiments of the invention may then match the angles (and not the vectors).

Coarse Registration

As described above, it is not necessary to test all candidates for matching. However, there are some areas where the likely candidates are and such candidates may cluster together. Coarse registration enables the performance of a quicker search since a subset of candidates (i.e., likely candidates) are searched compared to that of all segments.

At step 312, coarse registration is performed. A coarse transformation between each scan pair (i.e., pair of features) in a scan group (i.e., the filtered group of segments) is calculated. A refinement step (coarse and fine) (i.e., step 314) follows coarse registration step 312. The coarse-registration step 312 can be separated into two main components: rotation estimation and translation estimation.

Rotation

Before registration, it is assumed that the scan pair has a common floor and the same floor is detected correctly in both scans. This assumption reduces the search space from a 3D rotation space into a one-dimensional (1D) rotation space which is a rotation around the z-axis or the normal of the floor. Therefore, a single pair of features from two scans can be used to calculate a rotation candidate since the normals of the features are available.

Since calculating a translation and evaluating it for every feature pair from two scans has a huge computational load, a histogram of rotation angle candidates is created and the first M (20) bins (or other predefined number of bins) of this histogram with the maximum/highest number of votes in it are considered (and may be provided/accessed via a look-up table). A histogram of angles from 0 to $2*\pi$ with bin size of 2 degrees (180 bins in total) is created. From each feature pair that has similar angles with the z-axis, a rotation angle around the z-axis is calculated and the value of the corresponding histogram bin is increased by 1. By doing this, the correct matches are assumed, transformation will focus on similar bins, and random false matches will not create a peak in the histogram. In order to be sure that the correct transformation is not missed, the best (M) bins of the histogram are considered and the translation for the rotation estimates corresponding to these (M) bins is calculated.

Translation

The translation in the z-axis is set to the difference between the floor centers' z-coordinates since it is assumed that the floors are common and approximately planar. Since the translation values are refined later in the process, this assumption does not affect the end results if the floor is detected correctly.

Then the search space is reduced to 2D translations (x-y axis). In order to calculate a 2D translation, two pairs of features are necessary. Therefore every two pairs from two scans are considered. However, since the transformation between two scans is a rigid transformation, the angle between one pair of features must be preserved in the second pair of features. So embodiments of the invention may only consider the second pair if it has a similar angle between its features with the first pair's features' angles. Also, the pairs that have features with approximately parallel normals are removed since they don't provide enough information to estimate a 2D translation.

Accordingly, for each rotation candidate, two pairs of features are selected and the translation is calculated by minimizing the plane-to-point distances between the center point of the features in the source scan and the features in the destination scan, and between the center point of the features in the destination scan and the features in the source scan (a symmetric cost function which removes the effect of scan order). Then each estimate is evaluated by projecting all features in the source scan onto the destination scan and counting the number of features that have a match in the destination scan and vice versa. Two features are matched if they are spatially close and have a similar normal (e.g., within 1-2 degrees). To speed up the evaluation process, the 3D centers of features are projected onto the destination scan's spherical image and only the features that are within a few percent of the image width with respect to the 2D projection point are considered.

In view of the above, in general, there are ten-twenty (10-20) segments that are large and represent major walls, floors, and ceiling. Such large segments often agree with each other on how they match (e.g., rotation and translation). If it is not possible to match the large segments, embodiments of the invention may then proceed to smaller segments (e.g., the side of a door frame) (e.g., by looping through potential segments of a scan to determine if there is something that can constrain an axis or determine a translation/rotation). The use of the smaller segments is similar to searching for a geometric anomaly or characteristic that will enable the matching of segments.

Coarse Refinement

Based on the rotation and translation described above, a set of candidate segments for matching are acquired. To more accurately perform the matching, further refinement is needed.

The coarse translation estimated above is refined by using all the features that are matched. A similar method that is used in the pairwise estimation is used to refine the translations (tx and ty). In this case, instead of using two pairs all of the matched feature pairs are used.

Fine Refinement

In this step, the coarse transformation (rotation+translation) is refined by using the points on the binary image. This step uses more sample points for the ICP (iterative closest point) and results in a better alignment since the increased number of points leads to a more homogeneous fit.

Accordingly, the results from the rotation and translation are used as the basis for extracting sample points from the segments. An ICP method is then performed on the extracted sample points to further match the segments/features.

Scoring the Estimate

Once all of the pairwise matches are acquired, a determination is made regarding which matches are better/the most useful. In this regard, some of the matches may overlap and some matches may conflict. By scoring matches, one can determine which connection/match is the best amongst the possible candidates. Thus, at step 316, the matches/estimates are scored.

As an example, assume that segment 1 is registered to segment 2, segment 2 is registered to segment 3, segment 4 is registered to segment 5, segment 5 is registered to segment 1, and segment 5 is registered to segment 3. While such matches/registrations may represent a loop, the link between 5 and 1 may be a weak link so it is unknown if a separate cluster should be defined or if the link is part of the overall scanned system. Similarly, 5 may have a weak connection with 3. Thus, the connections between 5 and 1, and 5 and 3 conflict with each other. A determination needs to be made regarding which match is preferred/better. The scoring mechanism of embodiments of the invention determines which match/connection is preferred/should be utilized.

At step 316, for each selected pairwise transformation, a metric that shows the amount of overlap is calculated (match/no match scores based on visibility). This metric is used as a quality score of the estimated transformation and used when the scans are clustered into a global scene.

In addition, a cycle-based scoring may be used to select locally consistent scan cycles. Each scan triplet (i.e., a match for three) is evaluated by applying all the transformations between each scan. The transformations (edges) are considered as stable if the loop/round-trip around the scans (nodes) ends up in a close proximity of the starting point. In order to create a score from edge cycles, the score of an edge is increased if any "good" cycle passes through that edge.

Growing a Scene—Clustering

As the final step of registration, a global network of scans is created by merging scan nodes with a strong edge (transformation) between them. In other words, at step 318, segments/scan nodes are clustered together to merge the scans.

In the beginning of merging, only nodes that have edge-cycle scores that are higher than some certain threshold may be considered. In this regard, pairs with a "good" edge between them are sorted using the match/no-match scores. Then the pairs are merged starting from the highest scored pair. If the pair has no connection with other clusters, a new cluster is started. If any edge links two clusters by merging two scans from each cluster, then clusters are also merged.

Final Global Refinement—Bundle Adjustment

In addition to (or as part of the clustering step 318), further refinement may be performed. In this regard, a full cluster is acquired (as described above) and the connections between scans are known (along with the rotations and translations). Embodiments of the invention attempt to resolve/minimize all errors in the merged scans using a bundle adjustment operation (e.g., all at once). In other words, a bundle adjuster may minimize error over all the scans at once in a non-linear manner. More specifically, points may be matched to planes. As an example, scan 1 may provide a point (e.g., a lower right corner of a door) while scan 2 provides a plane (e.g., the wall). The bundle adjuster will attempt to place the point as close to the plane as possible.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, embodiments of the invention provide the ability to register multiple scans to each other. More specifically, a single scan may have important measurements (e.g., between a wall and floor). However, if the user desires to measure the length of an entire building, one scan may not cover the entire distance and the multiple scans must be properly aligned to provide an accurate measurement. Embodiments of the invention register the different scans together so that the user can work with an entire building instead of a single scan. Such a process must determine which elements/parts of a scan match with elements/parts of another scan. To provide such capabilities, the scanned scenes are segmented (by extracting segments) and features are extracted from the segments. The segments are then sorted and filtered to reduce the number of segments that are compared to each other. The features within the sorted and filtered segments are compared to each other based on rotation and translation operations (resulting in pairs of matching features). The pairs of matching features are refined based on all of the matched features, and further refined by comparing the points within the features. The refined matching pairs are then scored and clustered based on the score to merge scans together.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for merging multiple point cloud scans, comprising:
   (a) importing a first raw scan file and a second raw scan file for a scene, wherein each raw scan file comprises multiple points;
   (b) segmenting the first raw scan file and the second raw scan file by extracting first segments from the first raw scan file and second segments from the second raw scan file, wherein the extracting is based on geometry in the scene;
(c) filtering the first segments and the second segments to:
(1) reduce a number of the first segments and second segments; and
(2) identify first features from the reduced number of first segments and second features from the reduced number of second segments;
(d) coarsely registering one or more of the first features to one or more of the second features to acquire a set of candidate matching feature pairs;
(e) refining the registering by improving alignment of the set of candidate matching feature pairs, wherein the refining the registering is based on points in the first raw scan file and the second raw scan file corresponding to the first features and the second features;
(f) scoring the candidate matching feature pairs; and
(g) merging the first raw scan file with the second raw scan file based on the scoring, to create a merged scan file.

2. The computer-implemented method of claim 1, wherein the filtering the first segments and the second segments is based on segment size, segment normal, and z-coordinates of the first segments and the second segments.

3. The computer-implemented method of claim 2, wherein the filtering comprises:
filtering out floor and ceiling segments.

4. The computer-implemented method of claim 1, wherein the coarsely registering comprises:
a rotation estimation; and
a translation estimation.

5. The computer-implemented method of claim 4, wherein the rotation estimation comprises:
determining rotation angles around a z-axis for the first features and the second features; and
selecting rotation angle candidate pairs of the first features and the second features based on a similarity of the rotation angles.

6. The computer-implemented method of claim 5, wherein the translation estimation comprises:
determining a translation for each of the selected rotation angle candidate pairs;
determining candidate matching feature pairs based on a similarity of the translations.

7. The computer-implemented method of claim 1, wherein the refining the registering further comprises coarse refining the registering based on all of the candidate matching feature pairs.

8. The computer-implemented method of claim 1, wherein the scoring comprises:
computing an amount of overlap between the first feature and the second feature of each candidate matching feature pair.

9. The computer-implemented method of claim 1, further comprising minimizing errors in the merged scan file using a bundle adjustment operation.

10. A computer system for merging multiple point cloud scans comprising:
(a) a computer;
(b) a point cloud scanner communicatively coupled to the computer, wherein the point cloud scanner obtains a first raw scan file and a second raw scan file for a scene, wherein each raw scan file comprises multiple points;
(c) an application executing on the computer that:
(1) segments the first raw scan file and the second raw scan file by extracting first segments from the first raw scan file and second segments from the second raw scan file, wherein the extracting is based on geometry in the scene;
(2) filters the first segments and the second segments to:
(i) reduce a number of the first segments and second segments; and
(ii) identify first features from the reduced number of first segments and second features from the reduced number of second segments;
(3) coarsely registers one or more of the first features to one or more of the second features to acquire a set of candidate matching feature pairs;
(4) refines the registering by improving alignment of the set of candidate matching feature pairs, wherein the application refines the registering based on points in the first raw scan file and the second raw scan file corresponding to the first features and the second features;
(f) scores the candidate matching feature pairs; and
(g) merges the first raw scan file with the second raw scan file based on the scoring, to create a merged scan file.

11. The computer system of claim 10, wherein the application filters the first segments and the second segments based on segment size, segment normal, and z-coordinates of the first segments and the second segments.

12. The computer system of claim 11, wherein the application filters by:
filtering out floor and ceiling segments.

13. The computer system of claim 10, wherein the application coarsely registers using a:
a rotation estimation; and
a translation estimation.

14. The computer system of claim 13, wherein the rotation estimation comprises:
determining rotation angles around a z-axis for the first features and the second features; and
selecting rotation angle candidate pairs of the first features and the second features based on a similarity of the rotation angles.

15. The computer system of claim 14, wherein the translation estimation comprises:
determining a translation for each of the selected rotation angle candidate pairs;
determining candidate matching feature pairs based on a similarity of the translations.

16. The computer system of claim 10, wherein the application refines the registering by coarse refining the registering based on all of the candidate matching feature pairs.

17. The computer system of claim 10, wherein the application scores by:
computing an amount of overlap between the first feature and the second feature of each candidate matching feature pair.

18. The computer system of claim 10, wherein the application further minimizes errors in the merged scan file using a bundle adjustment operation.

* * * * *